May 22, 1951     H. O. WENDT     2,553,694
AIRCRAFT CONTROL SURFACE

Filed Aug. 31, 1946     2 Sheets-Sheet 1

INVENTOR.
HAROLD O. WENDT
BY Richard W. Treverton
ATTORNEY

Patented May 22, 1951

2,553,694

UNITED STATES PATENT OFFICE 2,553,694

AIRCRAFT CONTROL SURFACE

Harold O. Wendt, Columbus, Ohio, assignor to Curtiss-Wright Corporation, a corporation of Delaware Application August 31, 1946, Serial No. 694,175

5 Claims. (Cl. 244—82)

The present invention relates to aircraft control systems and has particular relation to such systems wherein means are provided to apply to aircraft control surfaces forces of greater magnitude than those exerted by the pilot.

As larger and higher speed aircraft have come into existence it has become increasingly important to provide means to augment the control forces exerted by the pilot. Various types of electrical and hydraulic power boost means have been developed for this purpose, as well as various systems wherein aerodynamic forces acting upon a relatively small booster surface, that is controlled by the pilot, serve to move the control surface.

Safe operation of aircraft to prevent unintentional stalling, and to prevent unintentional angular accelerations producing excessive loads on the aircraft and its occupants, requires that the pressures encountered by the pilot in moving the control system reflect or be generally proportional to the aerodynamic forces acting upon the control surface. In certain boost systems, this element of pilot control "feel" is lacking, with the result that the pilot by control action alone is unable to sense the loads on the control surface. It is an object of this invention to provide a boost system wherein means are provided for introducing such "feel," so that the pilot may be constantly aware of aerodynamic loads on the control surface by the pressure or resistance to movement of the control element which he operates.

According to the invention a boost or actuating means is provided to move or to aid the pilot in moving the control surface, this actuating means being operated by the pilot, and an auxiliary device connected for simultaneous operation by the pilot is arranged in the system in such a manner as to be acted upon by forces which are the same in direction and substantially proportional in magnitude to the aerodynamic forces upon the control surface.

In one type of boost system, known as the spring tab system, the pilot's controls are directly connected to a tab hinged to the control surface, and a resilient play connection is provided between the tab and control surface, so that pilot control movement may effect resiliently resisted relative movement of the tab and control surface, or, differentially, movement of the tab as a unit with the control surface. With this system the control effect of the tab on the control surface so increases with velocity of the aircraft, particularly in the higher subsonic speed ranges, that the pilot's control force decreases in proportion to angular accelerations of the aircraft produced by the control surface, thereby reducing the pilot's feel of the controls to a degree which may endanger the aircraft. The present invention, by transmitting air loads from an auxiliary surface to the pilot's control system, is advantageously employed in such spring tab system to restore the desired degree of feel.

The foregoing and other objects and advantages will become apparent from the following description of the typical embodiment of the invention shown in the accompanying drawings, wherein.

Figure 1:
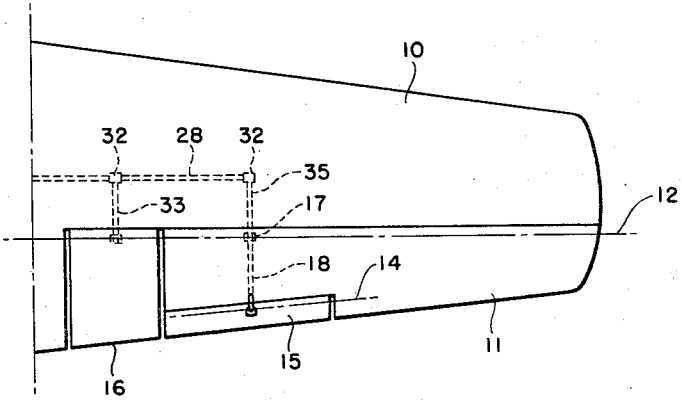
Figure 1 is a plan view of an airfoil having a hinged control surface, spring tab and the auxiliary surface of the present invention.
Figure 2:
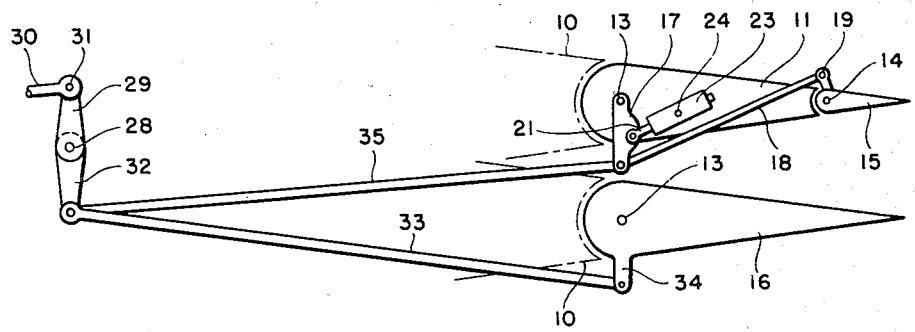
Figure 2 is a diagrammatic side elevational view illustrating the control connections of the elements shown in Figure 1.
Figure 3:
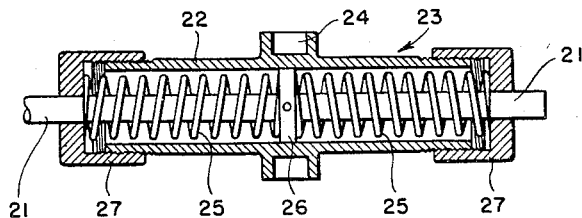
Figure 3 is a detail sectional view of a spring cartridge unit employed to resiliently connect the control surface and the tab.

There is shown in Figure 1 half of an aircraft stabilizer-elevator assembly, including a fixed stabilizer 10 and an elevator 11 hinged thereto upon axis 12, as for example by a hinge pin 13 (see Figure 2). Hinged at 14 to the trailing edge of the elevator is an actuator tab 15. Also hinged along axis 12 to the stabilizer 10 is an auxiliary or feeler airfoil 16. In Figure 2, for clarity of illustration of the operating connections, the airfoil 16 has been shown below the elevator 11, but it will be understood that in the embodiment of the invention herein described both the elevator and feeler airfoil are hinged along the same axis to the stabilizer. Pivoted to the elevator, also preferably along axis 12, is a lever 17, which is pivotally connected by a link 18 to a horn 19 on tab 15. A rod 21 also pivoted to lever 17 extends through casing 22 of a spring cartridge unit 23 that is pivoted at 24 to the elevator. The cartridge unit includes a pair of springs 25 each partially compressed between a cross-head 26, which is affixed to the rod 21, and the caps 27 which are adjustably secured upon the ends of the casing 22.

For operating the elevator surfaces for control purposes, a shaft 28 is journalled in the stabilizer structure. Affixed to the shaft is a lever arm 29 to which is pivoted at 31 a suitable linkage 30 that may extend to the control stick, control column or the like (not shown) in the pilot's compartment of the aircraft. Also affixed upon the shaft 28 are lever arms 32, one of which is pivotally connected by link rod 33 to a horn 34 on feeler airfoil 16, and the other of which is pivotally connected by link rod 35 to the lever 17.

In operation it will be seen that clockwise movement of the assembly 28, 29, 32, which for present purposes may be considered to be the pilot's control element, will cause both lever 17 and feeler airfoil 16 to swing clockwise about pivot axis 12 (hinge pin 13), and if air loads on the elevator 11 are low, the elevator and tab 15 will move substantially as a unit with lever 17. If air loads on the elevator are appreciable the lever will move relative to the elevator against the resistance of the spring cartridge unit, and will swing the tab counterclockwise about its hinge axis 14. Aerodynamic forces acting upon the upturned tab will urge the elevator downwardly; i. e., clockwise about its hinge connection to the stabilizer 10. Counterclockwise movement of the control element 28, 29, 32 will, of course, produce movements of the elevator, tab and auxiliary airfoil which are opposite to those described above.

It will be seen that the spring cartridge constitutes a resilient, play connection between the tab and elevator, and that the lever 17, link 18 and horn 19 constitute a differential connection between the tab and elevator by means of which control movement of link rod 35 may either cause the tab and elevator to move as a unit, or, differentially, to cause the tab to move relative to the elevator. It will also be understood that the tab functions as an actuator for the elevator, the tab being moved bodily by aerodynamic forces acting upon it about axis 12, in response to pivotal or control movement of the tab about axis 14.

Figure 4:
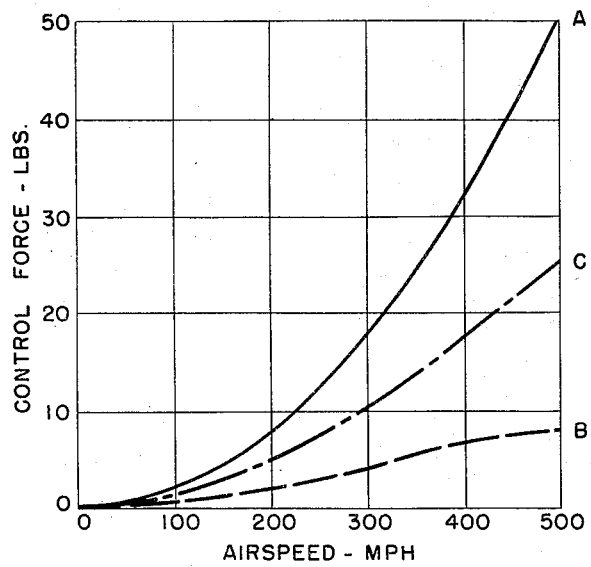
Figure 4 is a graph illustrating variation of control forces with airspeed; and, Figure 5 is a graph illustrating control or stick force per degree of angular acceleration of the aircraft with variation of airspeed.

In Figure 4 the pilot control forces required with a typical system of the kind described, compared with other systems, are graphically shown for various airspeeds. Assuming, first, a given aircraft in which the entire elevator surface (including both of surfaces 11 and 16) is deflected solely by pilot effort, the variation of control force with airspeed to produce a given angular deflection of the surface is illustrated by curve A. Control forces under the same circumstances for an aircraft having a usual form of spring tab system, i. e., as where the elevator sections 11 and 16 are positively connected to operate as a single unit and with the link rod 33 omitted, are shown by curve B. With the improved control system described herein, under the same circumstances the control forces are shown by curve C.

It will be noted that while pilot control forces are, advantageously, much lighter in the spring tab system than in the direct connected system, as may be seen by comparing curves B and A, the spring tab system has the undesirable characteristic that control force becomes excessively light in the high speed range as shown by the downward break in curve B in the range between 300 and 500 M. P. H. in the example chosen. It will also be seen that this characteristic is not appreciable in the system of the present invention, as is shown by curve C.

Figure 5:
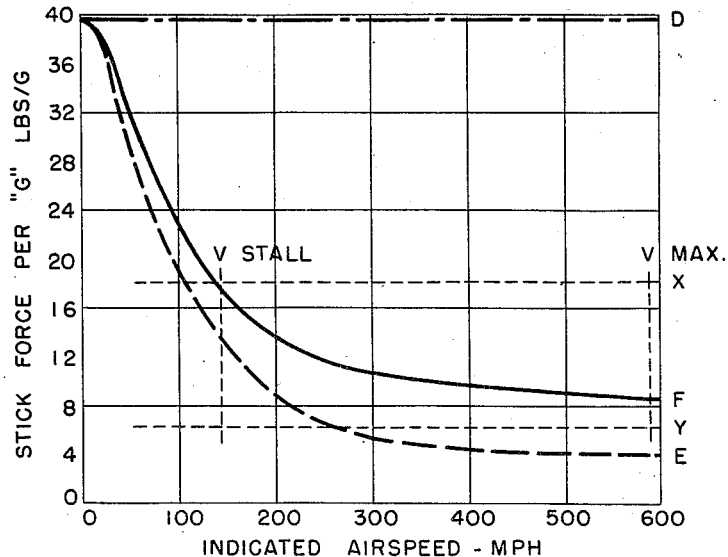

The variation with velocity of control forces per unit of angular acceleration for the three systems is shown in Figure 5, wherein curve D represents the direct connected system of curve A, curve E the conventional spring tab system of curve B, and curve F the improved system of curve C. In Figure 5 the control or stick force is indicated in pounds with the unit of acceleration, G, equal to the acceleration of gravity. Permissible variations of stick force per unit of acceleration is indicated by the dotted lines X and Y, and the speed range of the example aircraft is considered to be between the dotted lines designated "V Stall" and "V Max." It will be seen that with the direct connected control system, the stick force per unit of acceleration throughout the operating speed range greatly exceeds the permissible maximum X. With the conventional spring-tab system, the stick force per unit of acceleration, while satisfactory in the lower part of the speed range, becomes too low at higher speeds (above approximately 260 M. P. H. in the example chosen). With the system of the present invention, employing the feeler airfoil 16 to introduce into the control system loads per acceleration unit which are substantially constant with velocity, the stick load per G is maintained within the limits X—Y throughout the entire range of flight speeds.

It will be understood that the proportion of control effect of the auxiliary or feeler airfoil to the control effect of the primary control airfoil 11 may be varied as desired by changing the areas, shapes and locations of these surfaces. It will also be understood that while the control system herein specifically described is an elevator control, the invention is also applicable to aileron, rudder and like controls. For example, the member designated 10 may be considered to be a wing or vertical fin, and the member designated 11 to be an aileron or rudder, respectively. In these and other ways which will be apparent to those skilled in the art, the principles herein set forth may be applied to various aircraft control systems, without departing from the spirit of the invention or the scope of the appended claims.

I claim:

1. In an aircraft, a stabilizer, a primary elevator and an auxiliary elevator each hinged to the trailing edge of the stabilizer, a tab hinged to the primary elevator, pilot operable elevator control means including a torque shaft rotatably mounted in the stabilizer, a pair of lever arms on said shaft, a lever pivoted to the primary elevator substantially at the latter's hinge axis, a link connecting one lever arm with the auxiliary elevator and another link connecting the other lever arm with said lever, a resilient play connection between the lever and primary elevator biasing them for movement as a unit, and a third link connecting said lever and said tab for moving the tab about its hinge axis to the primary elevator in an angular direction opposite to movement of said lever.

2. In an aircraft, an airfoil, a control surface and a feeler surface each movably mounted upon the airfoil, an actuator surface movably mounted on the control surface for effecting movement of the latter by aerodynamic forces acting upon the actuator surface, means resiliently connecting said control surface and said actuating surface for differential movement, whereby upon movement of said means the control surface and actuator surface may move as a unit or the actuator surface may move relative to the control surface, a control element connected to said feeler surface and to said connecting means, whereby movement of the connecting means by said element from neutral position may be resisted by aerodynamic forces acting upon said feeler surface.

3. In an aircraft having mounted thereon a movable control surface and a movable feeler surface, an actuator surface movably mounted on the control surface for effecting movement of the latter by aerodynamic forces acting upon the actuator surface, means resiliently connecting said control surface and said actuator surface for differential movement whereby upon movement of such connecting means the control surface and the actuator surface may move as a unit or the actuator surface may move relative to the control surface to cause movement of the control surface by aerodynamic action, a control element connected to said feeler surface and to said connecting means, whereby movement of the connecting means from neutral position by said element may be resisted by aerodynamic forces acting upon said feeler surface.

4. An aircraft having thereon control surface means divided into a primary section and an auxiliary section, each of said sections being hinged to the aircraft for movement relative thereto independent of the other, a tab hinged to the primary section, means connecting said primary section and said tab for differential movement whereby upon movement of said means said primary section and the tab may move as a unit or the tab may move relative to said primary section for effecting movement of the latter by aerodynamic forces, said connecting means including resilient means acting between the primary section and the tab to bias them for movement as a unit, a control element connected to said connecting means for operating the latter, and an operating connection between said control element and said auxiliary section whereby hinge moments imposed on said auxiliary section will be transmitted to said control element.

5. An aircraft having thereon control surface means divided into a primary section and an auxiliary section, each of said sections being hinged to the aircraft for movement relative thereto independent of the other, a tab hinged to the primary section, a control element connected to the auxiliary section and to the tab for operating them in unison, the connection of said element to the tab being arranged to displace the tab in such direction as to effect movement of the primary section by aerodynamic action in the same direction that the auxiliary section is moved by the control element, and resilient means acting between the control element and the primary section biasing the primary section for movement in the same direction as the auxiliary section upon operation of the control element.

HAROLD O. WENDT.

REFERENCES CITED

The following references are of record in the file of this patent:

UNITED STATES PATENTS

| Number | Name | Date |
|---|---|---|
| 1,897,285 | Veit | Feb. 14, 1933 |
| 2,428,194 | Bockrath | Sept. 30, 1947 |
| 2,472,653 | Eaton | June 7, 1949 |

FOREIGN PATENTS

| Number | Country | Date |
|---|---|---|
| 321,851 | Great Britain | Dec. 3, 1928 |
| 383,590 | Great Britain | Nov. 17, 1932 |
| 691,115 | Germany | May 17, 1940 |